(12) United States Patent
Alvarado

(10) Patent No.: US 7,441,820 B1
(45) Date of Patent: Oct. 28, 2008

(54) TAILGATE LADDER SYSTEM

(76) Inventor: Rodolfo H. Alvarado, 6231 Ingram Rd., San Antonio, TX (US) 78238

( * ) Notice: Subject to any disclaimer, the term of this patent is extended or adjusted under 35 U.S.C. 154(b) by 0 days.

(21) Appl. No.: 12/045,701

(22) Filed: Mar. 11, 2008

(51) Int. Cl.
*B62D 33/03* (2006.01)
(52) U.S. Cl. .................................. 296/62; 182/127
(58) Field of Classification Search .................. 296/62, 296/57.1; 182/127; 280/163, 166
See application file for complete search history.

(56) References Cited

U.S. PATENT DOCUMENTS

| 4,180,143 | A | 12/1979 | Clugston |
| 4,757,876 | A | 7/1988 | Peacock |
| 5,028,063 | A | 7/1991 | Andrews |
| D330,535 | S | 10/1992 | Albertson |
| 6,422,342 | B1 | 7/2002 | Armstrong et al. |
| 6,857,680 | B2 | 2/2005 | Fielding |
| 6,966,597 | B2 | 11/2005 | Tegtmeier |
| 2004/0113450 | A1* | 6/2004 | Fielding ................ 296/62 |

* cited by examiner

*Primary Examiner*—Joseph D Pape

(57) ABSTRACT

A tailgate ladder system includes a pickup bed that has a tailgate hingedly coupled to the pickup bed. A bottom wall is attached to the tailgate and a pair of supports is attached to the bottom wall. A pair of guides is provided and each of the guides has a first end and a second end. Each of the guides is pivotally coupled to one of the supports. The guides are selectively positionable in a stored position lying on the bottom wall or in a deployed position vertically oriented when the tailgate is horizontally oriented. A step assembly comprises a pair of legs each having a top end and a bottom end. A plurality of panels is attached to and extends between the legs. Each of the legs is slidably positioned in one of the guides. The legs are selectively positionable in an extended position or in a retracted position.

5 Claims, 5 Drawing Sheets

TAILGATE LADDER SYSTEM

BACKGROUND OF THE INVENTION

Field of the Invention

The present invention relates to truck ladder devices and more particularly pertains to a new truck ladder device for positioning on a pickup bed to allow easy access to the pickup bed.

SUMMARY OF THE INVENTION

The present invention meets the needs presented above by generally comprising a pickup bed that has a tailgate hingedly coupled to the pickup bed adjacent to an end edge of the pickup bed. The tailgate has an inner surface and a distal edge with respect to the end edge. A bottom wall is attached to the inner surface adjacent to the distal edge. A pair of supports is attached to the bottom wall. A pair of guides is provided and each of the guides has a first end and a second end. Each of the guides is pivotally coupled to one of the supports adjacent to a corresponding one of the first ends. The guides are selectively positionable in a stored position extending between the distal edge and the end edge or in a deployed position vertically oriented when the tailgate is horizontally oriented. A step assembly comprises a pair of legs each having a top end and a bottom end. A plurality of panels is attached to and extends between the legs. Each of the legs is slidably positioned in one of the guides. The legs are selectively positionable in an extended position extending outwardly of the first ends of the guides or in a stored position retracted into the guides.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
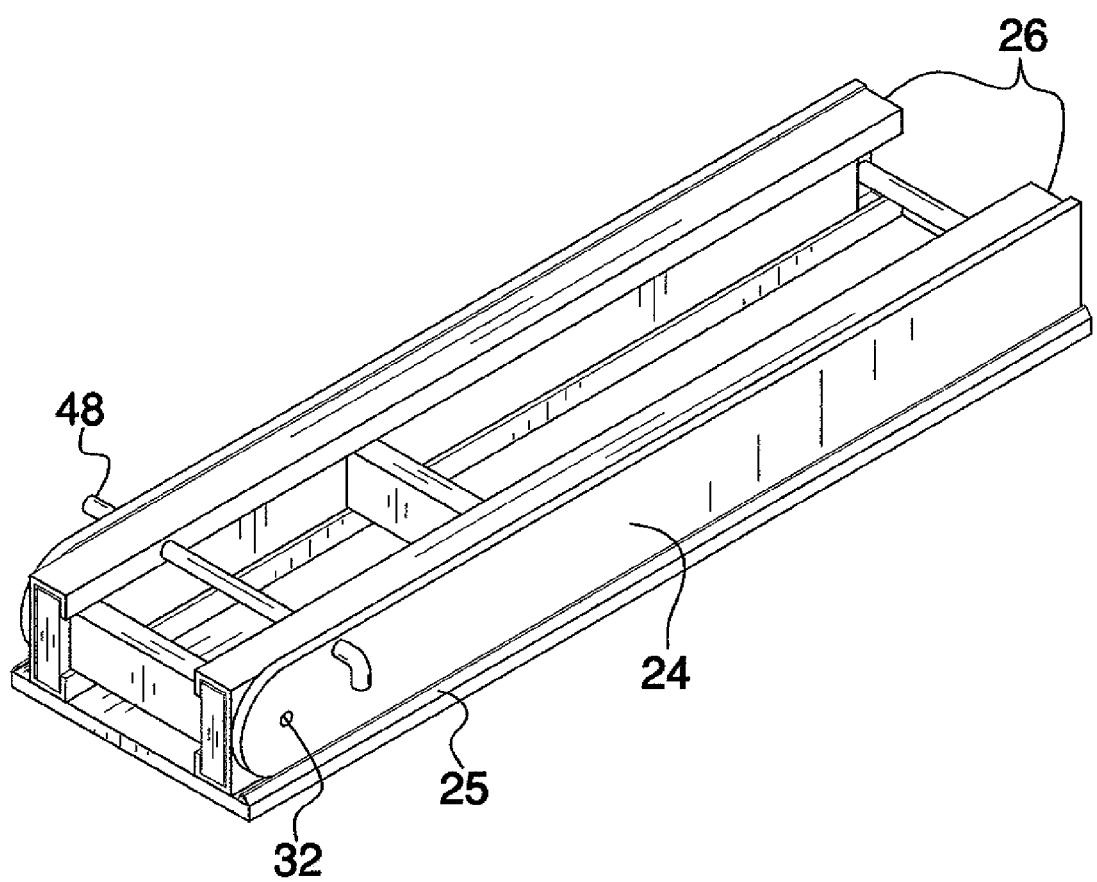
FIG. 1 is a top perspective view of a tailgate ladder system according to the present invention.
Figure 2:
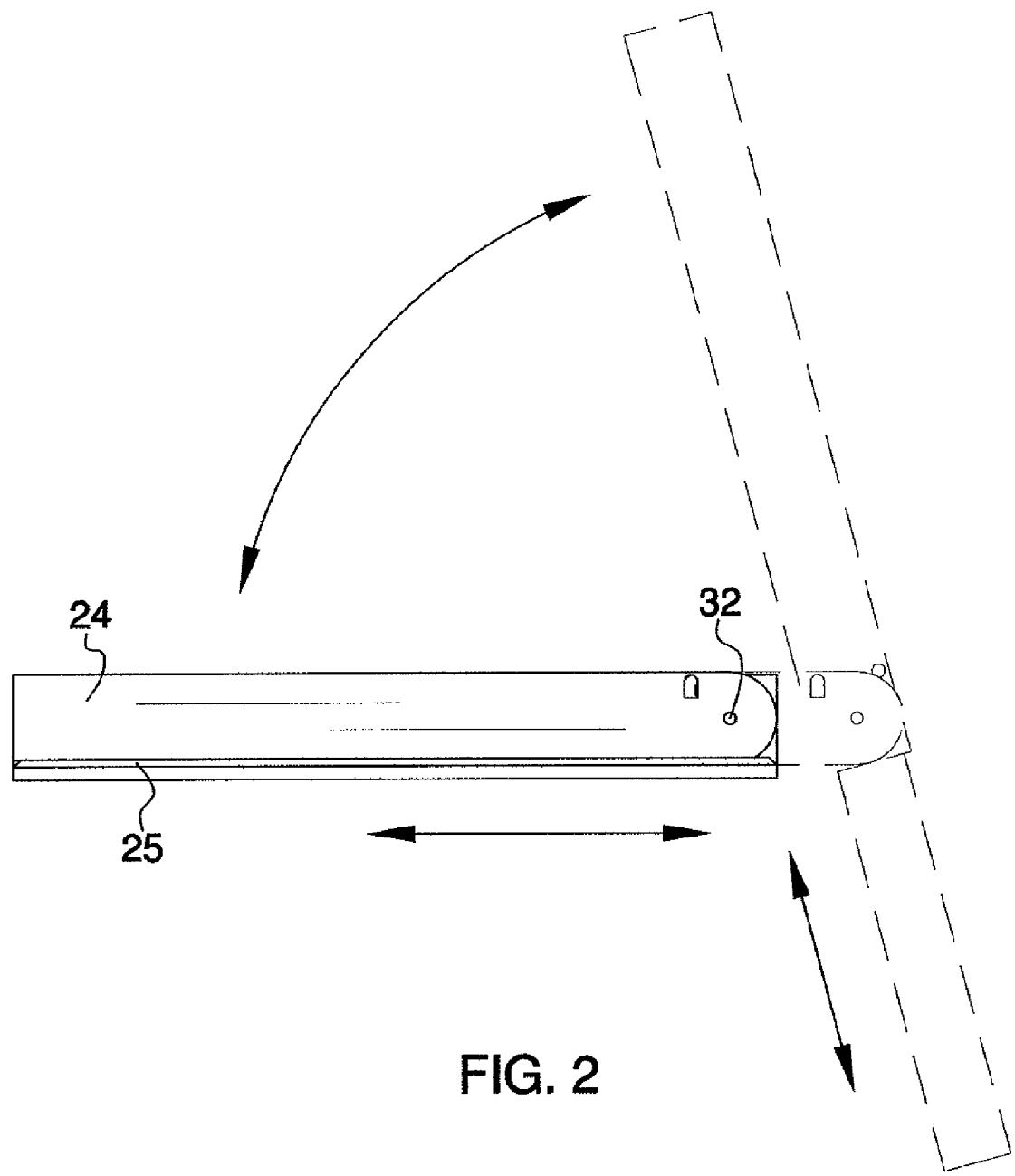
FIG. 2 is a side view of the present invention.
Figure 3:
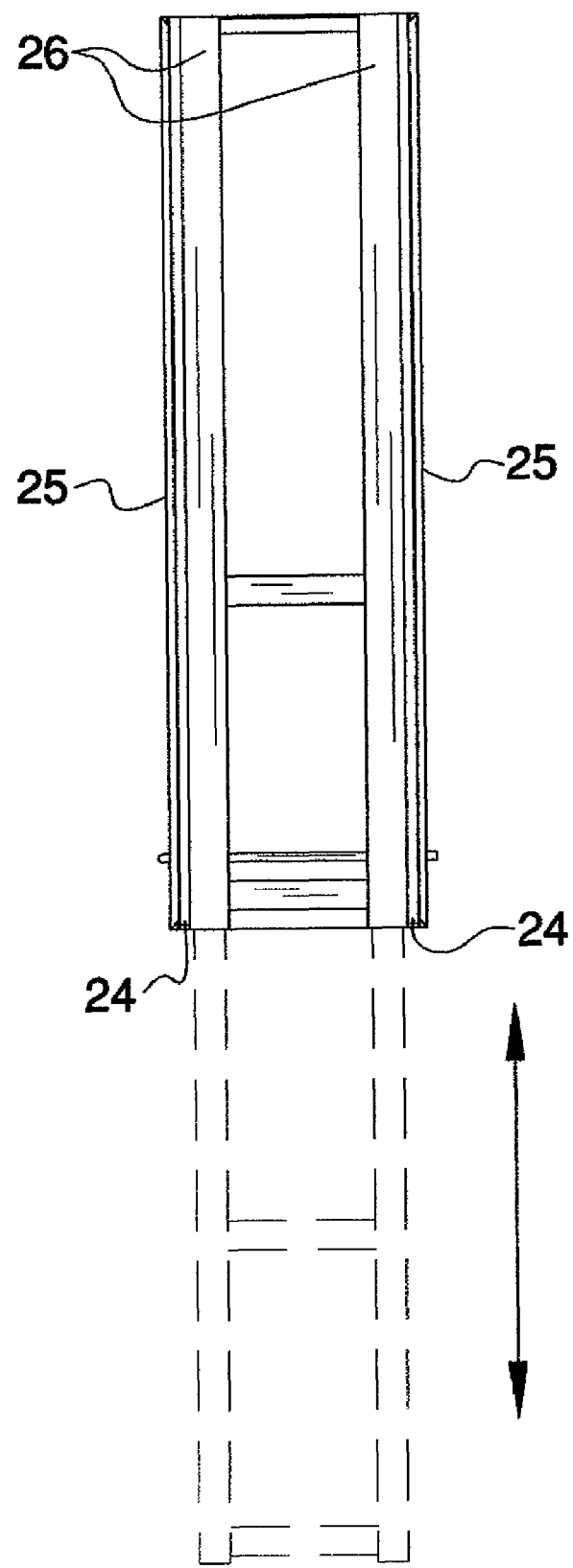
FIG. 3 is a top view of the present invention.
Figure 4:
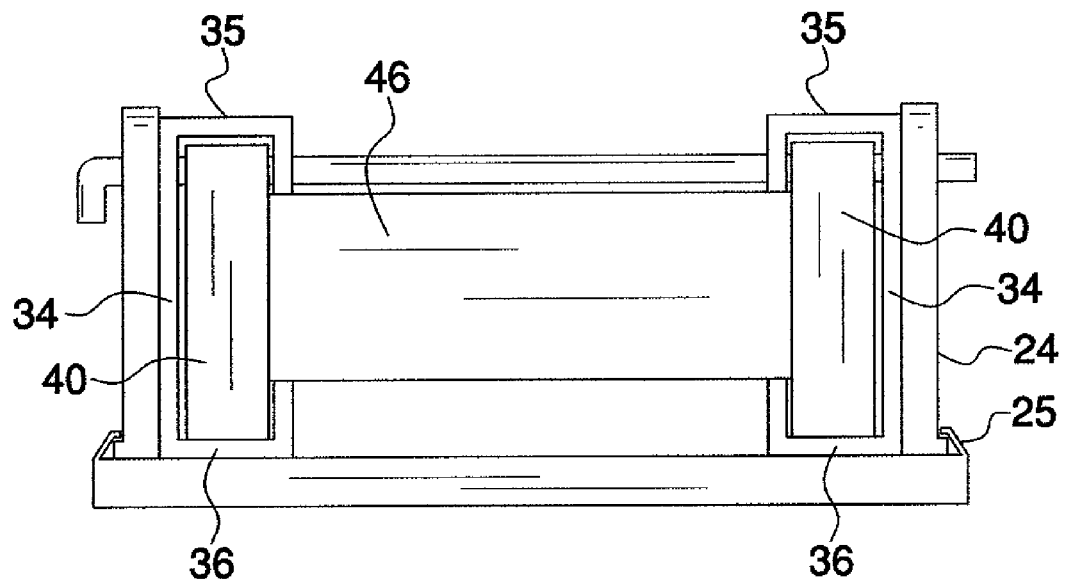
FIG. 4 is a front view of the present invention.
Figure 5:
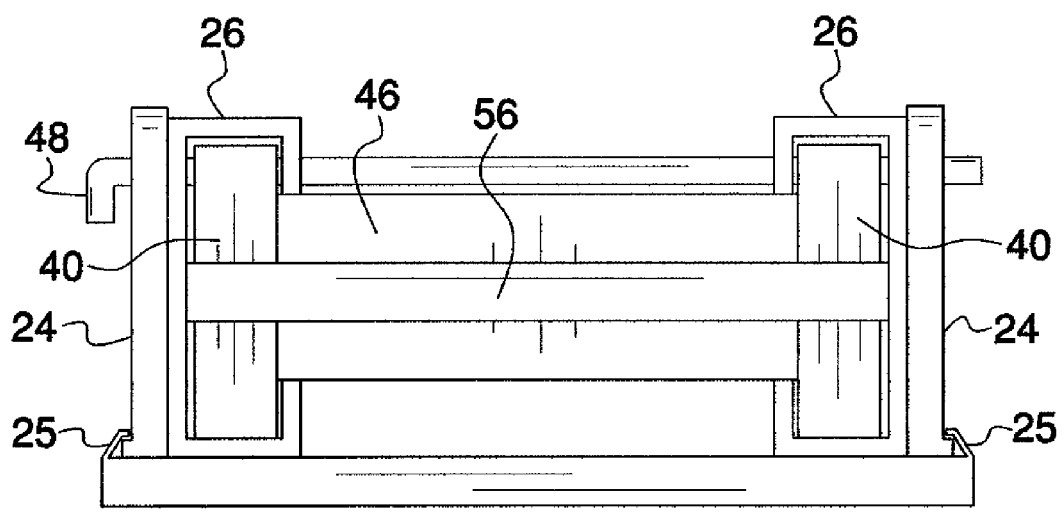
FIG. 5 is a rear view of the present invention.

With reference now to the drawings, and in particular to FIGS. 1 through 6 thereof, a new truck ladder device embodying the principles and concepts of the present invention and generally designated by the reference numeral 10 will be described.

As best illustrated in FIGS. 1 through 6, the tailgate ladder system 10 generally comprises a conventional pickup bed 12 and a tailgate 14 hingedly coupled to the pickup bed 12 adjacent to an end edge 16 of the pickup bed 12. The tailgate 14 has an inner surface 18 and a distal edge 20 with respect to the end edge 16.

A bottom wall 22 is attached to the inner surface 18 adjacent to the distal edge 20. A pair of supports 24 is slidably attached to the bottom wall 22. The supports 24 are mounted on rails 25 so that they are extendable outwardly of the distal edge 20. The supports 24 are elongated and oriented parallel to each other.

A pair of guides 26 is provided. Each of the guides 26 has a first end 28 and a second end 30. The guides 26 are pivotally coupled to one of the supports 24 adjacent to a corresponding one of the first ends 28 with pivot rods 32. The guides 26 are selectively positionable in a stored position extending between the distal edge 20 and the end edge 16 or in a deployed position vertically oriented when the tailgate 14 is horizontally oriented. The guides 26 each include a side wall 34, an upper wall 35 and a lower wall 36. A receiving space 37 is defined between the upper 35 and lower 36 walls.

A step assembly 38 comprises a pair of legs 40 each having a top end 42 and a bottom end 44. A plurality of panels 46 is attached to and extends between the legs 40. Each of the legs 40 is slidably positioned in one of the receiving spaces 37 of the guides 26. The legs 40 are selectively positionable in an extended position extending outwardly of the first ends 28 of the guides 26 or in a stored position retracted into the guides 26.

A locking pin 48 is extendable through the step assembly 38 and the supports 24 to selectively lock the step assembly 38 in the stored position or in the extended position. The locking pin 48 extends into first apertures 50 to secure the guides 26 in the deployed position and into second apertures 52 to secure the guides 26 in the stored position. The locking pin 48 is also extendable through different sets of openings 54 in the legs 40 to selectively secure the legs 40 in the stored position. Additionally, the locking pin will extend through openings, not shown, in the legs which are positioned adjacent to the top end 42 when the locking pin 48 extends through the first apertures 50. In this manner, the locking pin 48 will extend through and lock together the supports 24, guides 26 and step assembly 38.

Figure 6:
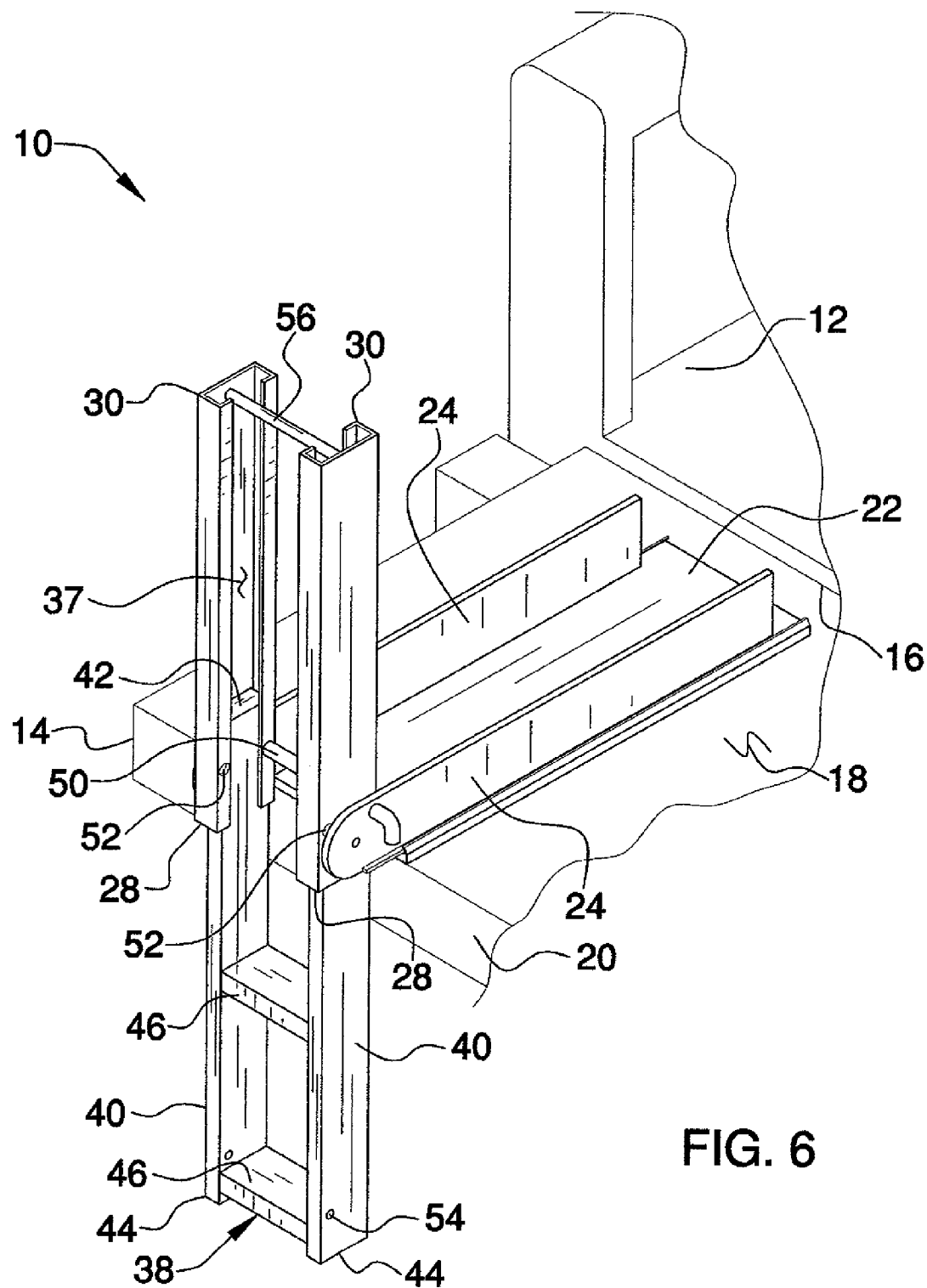
FIG. 6 is a perspective in-use view of the present invention.

A grip 56 is attached to and extends between the guides 26. The grip 56 is positioned adjacent to the second ends 30 of the guides 26. The grip 56 is positioned to be easily grasped when the step assembly 38 is vertically oriented as shown in FIG. 6. The grip 56 is also positioned to prevent the step assembly 38 from sliding outwardly from the second ends 30 of the guides 26.

In use, the system 10 is used to provide a ladder, as needed, to allow a person to easily enter the pickup bed 12 as needed. When the tailgate 14 is closed, the step assembly 38 is stored and will be retained within the pickup bed 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate ladder system comprising:
   a pickup bed having a tailgate hingedly coupled to said pickup bed adjacent to an end edge of said pickup bed, said tailgate having an inner surface and a distal edge with respect to said end edge;
   a bottom wall being attached to said inner surface adjacent to said distal edge, a pair of supports being attached to said bottom wall;
   a pair of guides, each of said guides having a first end and a second end, each of said guides being pivotally coupled to one of said supports adjacent to a corresponding one of said first ends, said guides being selectively positionable in a stored position extending between said distal edge and said end edge or in a deployed position being vertically oriented when said tailgate is horizontally oriented; and
   a step assembly comprising a pair of legs each having a top end and a bottom end, a plurality of panels being attached to and extending between said legs, each of said legs being slidably positioned in one of said guides, said legs being selectively positionable in an extended position extending outwardly of said first ends of said guides or in a stored position retracted into said guides.

2. The system according to claim 1, wherein said supports being slidably attached to said bottom wall, said supports being extendable outwardly of said end edge.

3. The system according to claim 1, further including a locking pin being extendable through said step assembly and said supports to selectively lock said step assembly in said stored position or in said extended position, said locking pin engaging said guides and releasably securing said guides in said deployed position when said locking locks said step assembly in said extended position, said locking pin engaging said guides and releasably securing said guides in said stored position when said locking pin locks said step assembly in said stored position.

4. The system according to claim 1, further including a grip being attached to and extending between said guides, said grip being positioned adjacent to said second ends of said guides.

5. A tailgate ladder system comprising:
   a pickup bed having a tailgate hingedly coupled to said pickup bed adjacent to an end edge of said pickup bed, said tailgate having an inner surface and a distal edge with respect to said end edge;
   a bottom wall being attached to said inner surface adjacent to said distal edge, a pair of supports being slidably attached to said bottom wall, said supports being extendable outwardly of said end edge;
   a pair of guides, each of said guides having a first end and a second end, each of said guides being pivotally coupled to one of said supports adjacent to a corresponding one of said first ends, said guides being selectively positionable in a stored position extending between said distal edge and said end edge or in a deployed position being vertically oriented when said tailgate is horizontally oriented;
   a step assembly comprising a pair of legs each having a top end and a bottom end, a plurality of panels being attached to and extending between said legs, each of said legs being slidably positioned in one of said guides, said legs being selectively positionable in an extended position extending outwardly of said first ends of said guides or in a stored position retracted into said guides;
   a locking pin being extendable through said step assembly and said supports to selectively lock said step assembly in said stored position or in said extended position; and
   a grip being attached to and extending between said guides, said grip being positioned adjacent to said second ends of said guides.

\* \* \* \* \*